United States Patent
Duncan

(10) Patent No.: US 7,474,779 B2
(45) Date of Patent: Jan. 6, 2009

(54) CHECK IMAGING DEVICE

(75) Inventor: Jeffrey R. Duncan, Rancho Palos Verdes, CA (US)

(73) Assignee: Magtek, Inc., Carson, CA (US)

( * ) Notice: Subject to any disclaimer, the term of this patent is extended or adjusted under 35 U.S.C. 154(b) by 450 days.

(21) Appl. No.: 10/755,002

(22) Filed: Jan. 9, 2004

(65) Prior Publication Data

US 2005/0053271 A1   Mar. 10, 2005

Related U.S. Application Data

(60) Provisional application No. 60/439,587, filed on Jan. 11, 2003.

(51) Int. Cl.
*G06K 9/00* (2006.01)
*G06Q 40/00* (2006.01)
*G07F 7/02* (2006.01)

(52) U.S. Cl. .................. 382/137; 235/379; 194/210

(58) Field of Classification Search .............. 382/137, 382/139, 140; 235/379; 194/210
See application file for complete search history.

(56) References Cited

U.S. PATENT DOCUMENTS

| 4,547,899 A | * | 10/1985 | Nally et al. ............ 382/139 |
| 4,776,021 A | * | 10/1988 | Ho ........................ 382/139 |
| 4,797,938 A | * | 1/1989 | Will ....................... 382/139 |
| 5,524,063 A | * | 6/1996 | Henrot ................... 382/139 |
| 5,532,464 A | * | 7/1996 | Josephson et al. ...... 235/379 |
| 5,634,729 A | * | 6/1997 | Kinney et al. ............ 400/73 |
| 5,754,673 A | * | 5/1998 | Brooks et al. ............ 382/112 |
| 5,783,808 A | * | 7/1998 | Josephson ............... 235/379 |
| 5,893,667 A |   | 4/1999 | Kinney et al. |
| 5,964,158 A | * | 10/1999 | Takahashi ............... 101/484 |
| 6,109,521 A | * | 8/2000 | Martinez et al. ........ 235/379 |
| 6,473,519 B1 | * | 10/2002 | Pidhirny et al. ......... 382/140 |
| 6,769,615 B2 | * | 8/2004 | Resseguie ............... 235/449 |
| 7,092,561 B2 | * | 8/2006 | Downs, Jr. .............. 382/139 |
| 7,124,936 B2 | * | 10/2006 | Templeton et al. ...... 235/380 |
| 2001/0045452 A1 | * | 11/2001 | Momose et al. ......... 235/379 |
| 2002/0191830 A1 |   | 12/2002 | Pidhirny et al. |

FOREIGN PATENT DOCUMENTS

GB    2205672 A  * 12/1988

OTHER PUBLICATIONS

International Search Report for International Application No. PCT/US2004/000406, filed Jan. 9, 2004, International Search Report dated Nov. 11, 2004 and mailed Nov. 23, 2004 (3 pgs.).
Written Opinion of the International Searching Authority for International Application No. PCT/US2004/000406, filed Jan. 9, 2004, Written Opinion mailed Nov. 23, 2004 (4 pgs.).

* cited by examiner

*Primary Examiner*—Samir A Ahmed
*Assistant Examiner*—Bernard Krasnic
(74) *Attorney, Agent, or Firm*—Christie, Parker & Hale, LLP

(57) ABSTRACT

A check reader and method for reading magnetic ink characters on a check involve a controller configured to control a motor to move a check through a check path in a first pass past a magnetic reading head in a first direction, and in at least one other pass past the magnetic reading head in another direction. In one embodiment, the controller moves the check through the check path in three passes, and in another embodiment the check is moved at different speeds during the respective passes.

22 Claims, 10 Drawing Sheets

CHECK IMAGING DEVICE

CROSS-REFERENCE TO RELATED APPLICATION

This application claims the benefit of U.S. Provisional Application No. 60/439,587, filed Jan. 11, 2003, the contents of which are incorporated herein by reference.

FIELD OF THE INVENTION

The present invention relates generally to reading information encoded from magnetic ink characters and more specifically to reliably reading magnetic ink characters on checks.

BACKGROUND OF THE INVENTION

Checks are commonly used in financial transactions as a substitute for hard currency. Exchanging goods or services for a check involves a risk that the check is forged or otherwise being fraudulently passed off as a legitimate negotiable instrument. In an effort to combat fraud, checks will often bear numbers written in magnetic ink that identify the bank and account from which the check is drawn. This information has traditionally been extracted using a Magnetic Ink Character Recognition (MICR) reader and used to validate the account electronically prior to accepting the written check. Accepted checks are then retained at the point of sale and later processed as a paper document through the banking system. Processing paper checks through the banking system can constitute a significant expense and can also result in a delay between the receipt of a check and the transfer of funds from the account on which the check is drawn.

Newer transaction systems use a process referred to as "check truncation", which can involve reading the MICR information on a check and capturing an image of the check. The MICR information is used to validate and accept the check and then the check is returned to the customer. The image of the check is retained by the vendor and is only provided to the bank to settle disputes between the bank and the customer concerning the validity of the check. The "check truncation" process is entirely electronic and does not involve the expense associated with handling paper checks.

Current check reading devices enable magnetic ink characters to be read twice to increase the confidence that the MICR has been read accurately. Typically, such devices will read the MICR on a check twice in the same direction or in a forward and reverse direction.

SUMMARY OF THE INVENTION

Embodiments of the present invention can reliably extract information stored in magnetic ink characters. In one embodiment, the invention relates to a check reader for reading magnetic ink characters on a check, including a check path, a motor configured to move the check along the check path, a magnetic reading head disposed along the check path, a controller configured to control the motor to move the check through the check path in a first pass past the magnetic reading head in a first direction and at a first speed, in a second pass past the magnetic reading head in a reverse direction and at a second speed, and in a third pass past the magnetic reading head in the first direction and at a third speed, where the controller is configured to receive a signal indicative of an output of the magnetic reading head during each pass of the check past the magnetic reading head, decode information from the signal indicative of the output of the magnetic reading head, determine a magnitude of the second speed based on the signal indicative of the output of the magnetic reading head received by the controller during the first pass, and generate an output signal indicative of the decoded information based on a comparison of all information decoded during said three passes of the check past the magnetic reading head.

In another embodiment, the invention relates to a method of reading magnetic ink characters on a check, including moving the magnetic ink characters relative to a magnetic reading head in a first direction and at a first speed in a first pass, decoding a first version of the magnetic ink characters based on an output from the magnetic reading head, storing the decoded first version of the magnetic ink characters, moving the magnetic ink characters relative to the magnetic reading head in a second direction and at a second speed in a second pass, decoding a second version of the magnetic ink characters based on an output from the magnetic reading head, storing the decoded second version of the magnetic ink characters, moving the magnetic ink characters relative to the magnetic reading head in a third direction and at a third speed in a third pass, decoding a third version of the magnetic ink characters based on an output from the magnetic reading head, storing the decoded third version of the magnetic ink characters, determining the second speed based on the output of the magnetic reading head in the first pass, determining the third speed based on the output of the magnetic reading head in the first pass, and generating an output signal based upon a comparison of the three decoded versions of the magnetic ink characters.

In yet another embodiment, the invention relates to a method of reading magnetic ink characters on a check, including moving the magnetic ink characters relative to a magnetic reading head in a first direction and at a first speed, decoding a first version of the magnetic ink characters based on an output from the magnetic reading head, storing the decoded first version of the magnetic ink characters, moving the magnetic ink characters relative to the magnetic reading head in a second direction and at a second speed determined based on the output of the magnetic reading head in the first direction, where the second direction is reversed from the first direction, decoding a second version of the magnetic ink characters based on an output from the magnetic reading head, storing the decoded second version of the magnetic ink characters, moving the magnetic ink characters relative to a magnetic reading head in a third direction and at a third speed, decoding a third version of the magnetic ink characters based on an output from the magnetic reading head, and generating an output signal based upon a comparison of the three decoded versions of the magnetic ink characters.

DETAILED DESCRIPTION OF THE INVENTION

Figure 1:
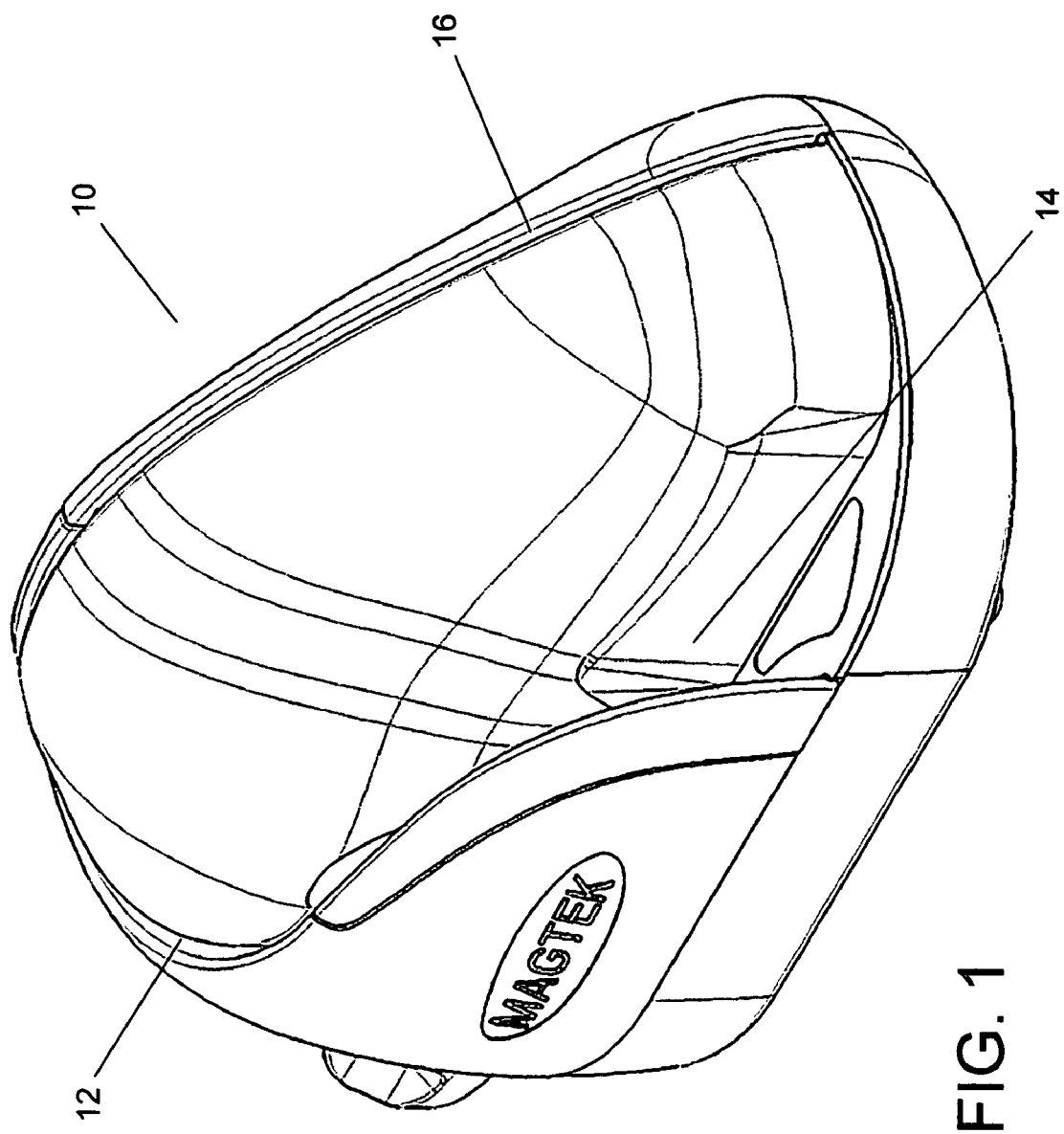
FIG. 1 is an isometric view of a check reading device in accordance with the present invention.

Referring now to the drawings, check imaging devices in accordance with practice of the present invention are illustrated. The check imaging devices include a check path with a magnetic reading head, a scan bar located along the check path and a motorized conveyancing system configured to move a check in either direction through the check path. In operation, the check imaging devices move the check through the check path at least three times and decode magnetic ink characters on the face of the check during each pass. The three passes provide three sets of data corresponding to the MICR information on the check. The check imaging device can compare these three data sets to reliably determine the actual information encoded as magnetic ink characters on the check. The comparison can also be used to conclude that a determination cannot be made because the information was not extracted in any of the passes with sufficient reliability. In such circumstances, the check imaging device can indicate that the check should be rescanned or that the check should be rejected. In several embodiments a match between two passes is sufficient to make a determination that the information was reliably decoded. In some embodiments, the check imaging device varies different operating parameters of the mechanical system, such as the speed with which the check is moved through the check path. Such variations in the operating parameters of the check reader enable more reliable determinations of the MICR information on the check.

Turning now to FIG. 1, a check imaging device 10 constructed in accordance with the present invention includes a horseshoe shaped check path 12. Checks are fed into the check path at an entrance 14 and are expelled from the device at an exit 16. In other embodiments (not shown), the check may be fed and expelled from the same location and the check path can be straight, curved or involve any other course through which a check can travel.

Figure 2:
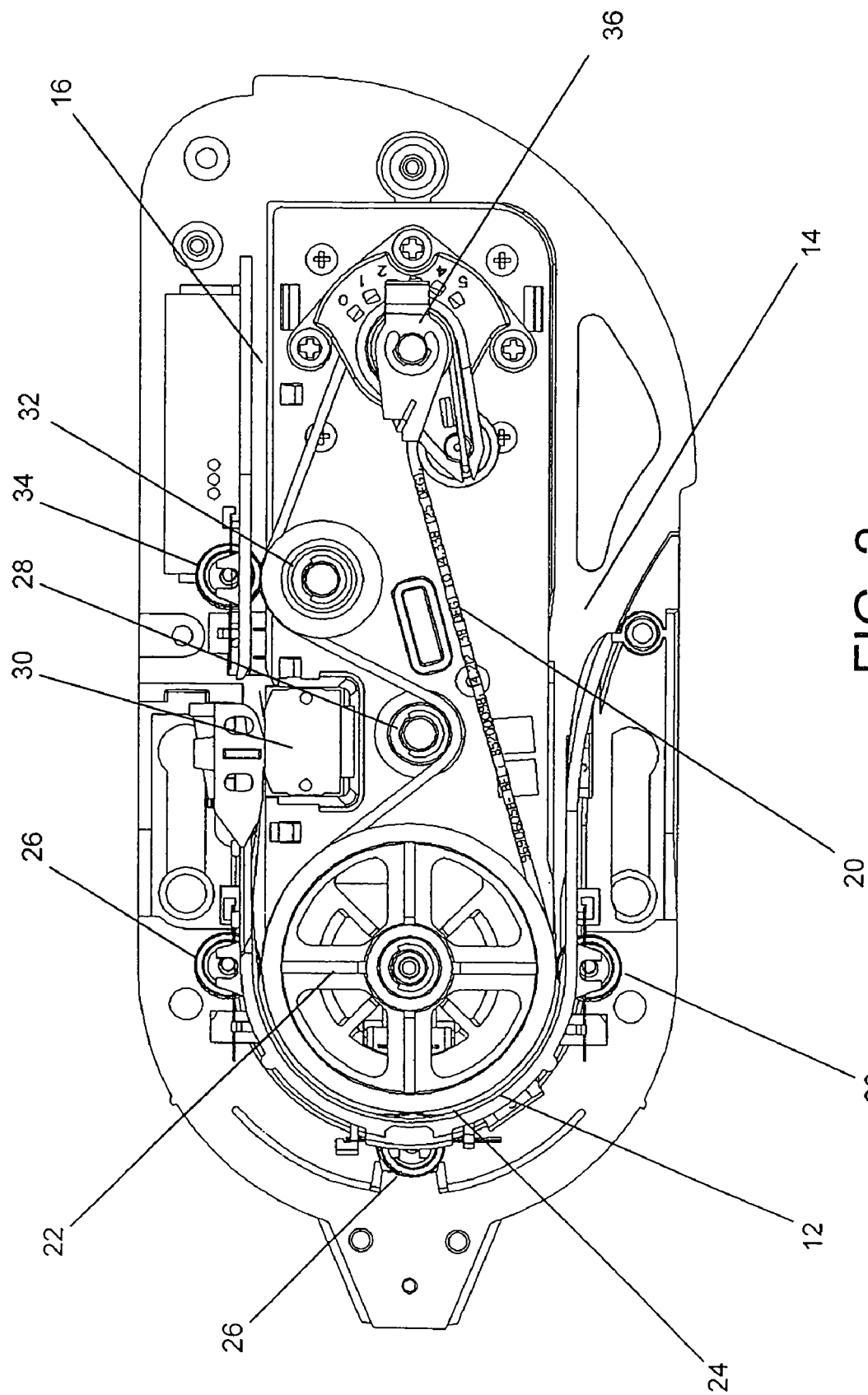
FIG. 2 is a top plan view of the internal mechanical and electronic components of a check reading device in accordance with the present invention.

The internal components of the check imaging device used to move a check through the check path are illustrated in FIG. 2. The entrance 14 of the check path is flared outwardly to facilitate the feeding of a check into the check path. Thus, the path 12 tapers from the flared entrance to a relatively narrow width causing a check to be guided easily into the device. The combination of a series of free spinning rollers and a motorized belt 20 enable checks to move through the check path. The belt is fitted around a series of pulleys that are located so that the surface of the belt can contact a check at certain locations within the check path.

In the illustrated embodiment, the belt is threaded over a series of four pulleys. A horseshoe pulley 22 is located within the horseshoe of the check path and enables the portion of the belt that is threaded around the horseshoe pulley to remain in contact with the check throughout a horseshoe section 24 of the check path. Three rollers 26 are located along the horseshoe section of the check path and these rollers are configured to force a check against the portion of the belt that is threaded about the horseshoe pulley. When a check is pinched between one of the rollers and the belt, motion of the belt causes the check to move through the horseshoe section of the check path. In several embodiments, pivotally mounted rollers 26 force the bottom edge of the check downward as the check moves through the check path to correct any misalignments of the check that may result when the check is fed into the reader in an incorrect manner.

Adjacent the horseshoe pulley is an offset pulley 28 that causes the belt to deviate around a scan bar 30 between the horseshoe pulley and an exit pulley 32. The exit pulley is located to enable a portion of the belt to contact a check in the check path after the check has emerged from the horseshoe section of the check path. A back-up roller 34 opposite the exit pulley forces a check against the portion of the belt that is threaded around the exit pulley, enabling movement of the belt to move a check through the check path. The fourth pulley is a drive pulley 36 that includes a tension adjustment mechanism, which enables the belt to be easily installed or removed over the other pulleys. The tension mechanism enables the belt to be loosely fitted over all of the pulleys and then the tension on the belt can be increased so that rotation of the drive pulley will cause the belt to move and the other pulleys to rotate. In the embodiment shown, a motor is used to rotate the drive pulley and the other pulleys are free spinning. In other embodiments, a motor could be used to drive any of the pulleys and other configurations of belts, pulleys and/or rollers can be used to move a check through the check path.

Figure 3:
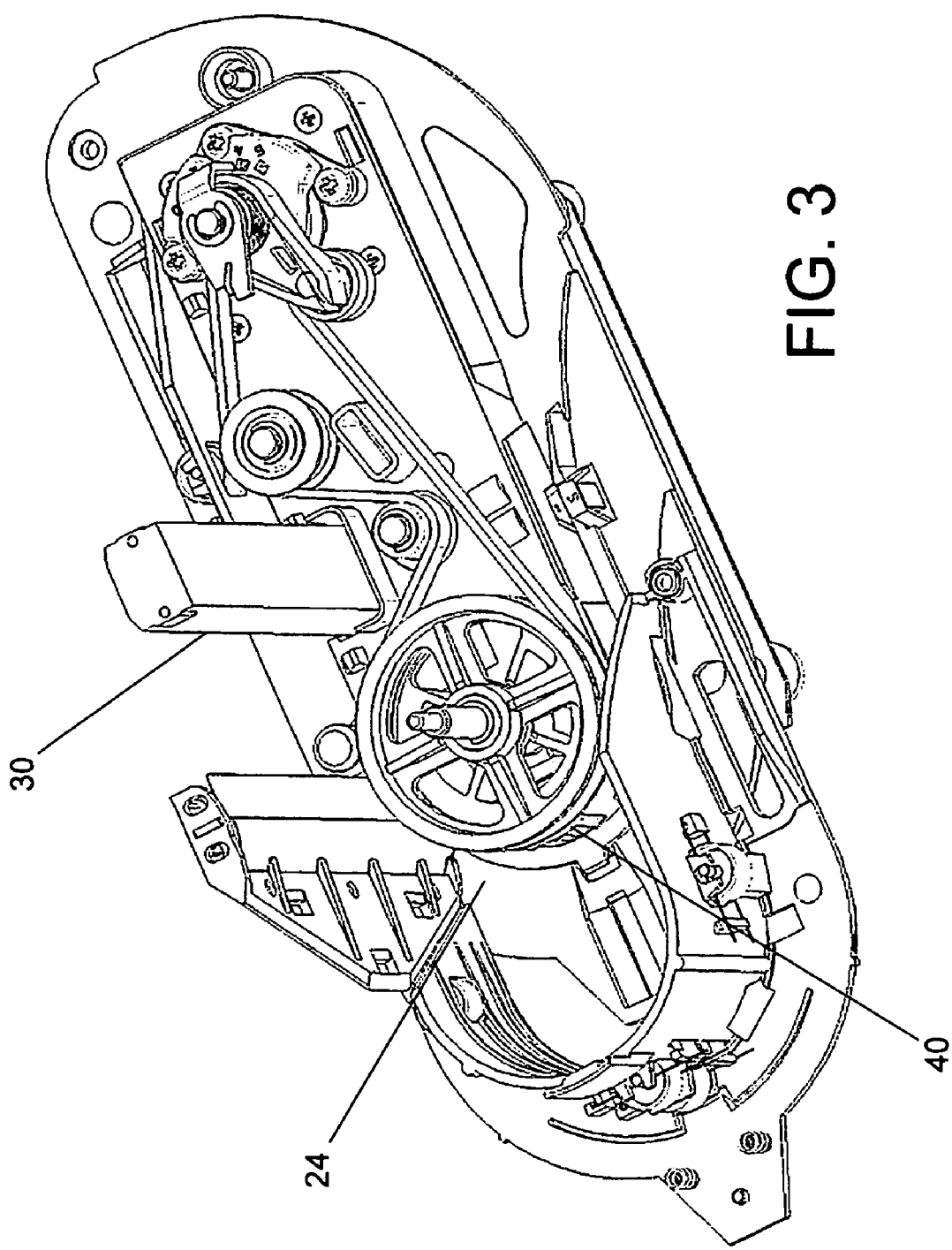
FIG. 3 is an isometric view of a check reading device in which the external covers of the device have been removed to reveal the internal components and in which a subassembly has been moved a distance away from the check imaging device to reveal the check path of the check reading device with greater clarity.

The locations of a magnetic reading head and the scan bar along the check path 12 are shown in FIG. 3. A magnetic reading head 40 is located in the horseshoe of the check path to read magnetic ink characters on checks moving through the device. The scan bar 30 captures images of checks as they pass along the check path.

Figure 4:
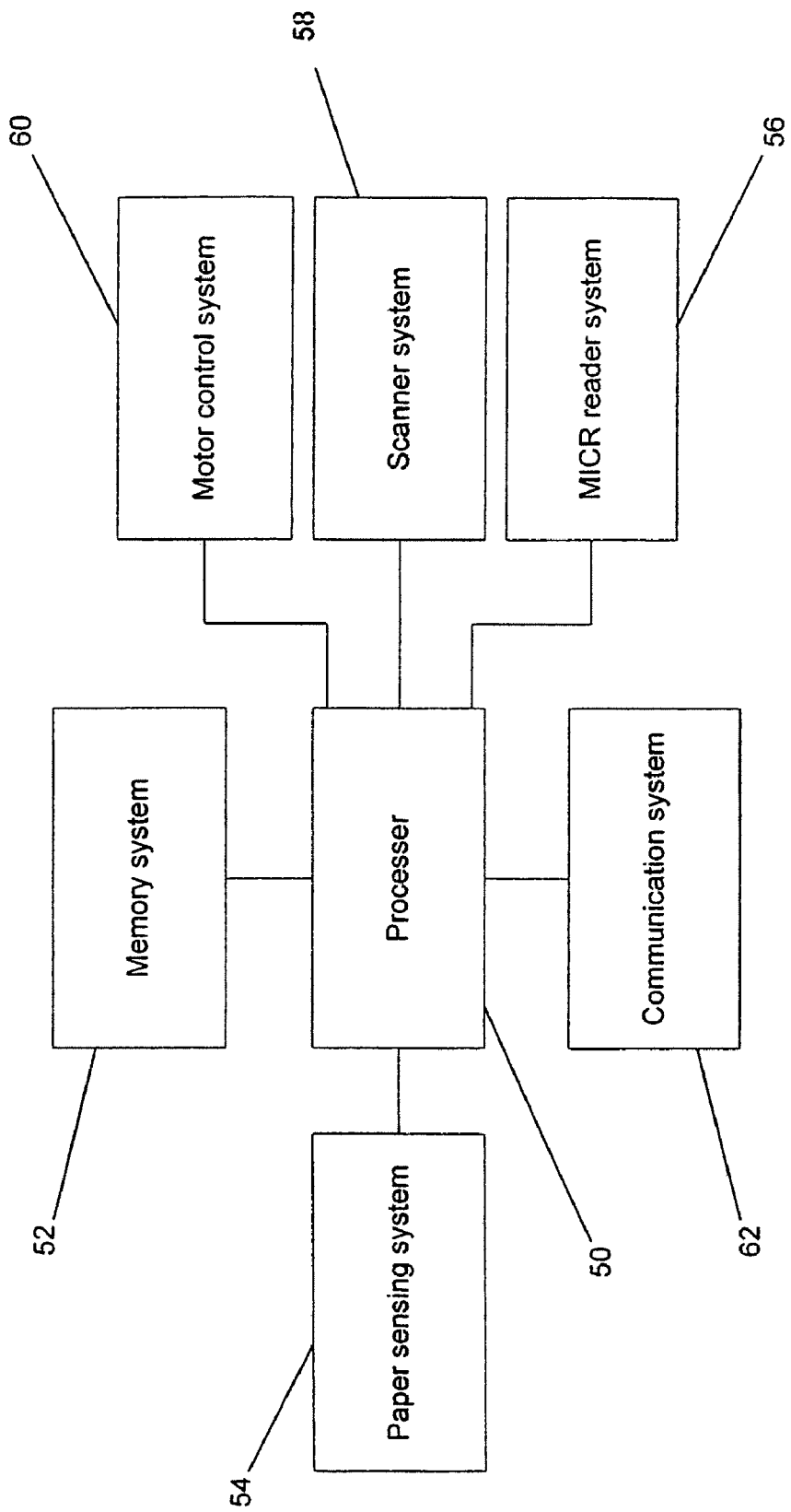
FIG. 4 is a schematic diagram of a system in accordance with the present invention for moving a check through the check path of a check reading device, for reading MICR located on the check and for capturing a digital image of the check.

A system that can be used to control the movement of a check through a check path, to read information recorded as MICR information on a check and to capture an image of a check, is illustrated in FIG. 4. The system 40 includes a processor 50 that is connected to a memory system 52. The memory system can house data and the software used to configure the processor. The processor is also connected to a paper sensing system 54. The paper sensing system enables the processor to receive signals from a number of sensors (not shown) located along the check path that can detect the presence of a check at specific locations. The processor is also connected to a scanner system 58, a MICR reader system 56 and a motor control system 60. The scanner system controls the scan bar 30 and provides information to the processor indicative of image information obtained by the scan bar. The MICR reader system provides the processor with signals from the magnetic reading head 40 that are indicative of the magnetic field sensed by the magnetic reading head. These signals can be used to decode information stored as magnetic ink characters on a check as the characters pass the magnetic reading head. The motor control system enables the processor to control the motor in the check imaging device. By activating, deactivating or reversing the direction of the motor, the processor is able to move a check in a controlled manner through the check path using the belt and rollers of the check imaging device in the manner described above.

The processor is also connected to a communications system 62, which contains electronics for communicating with external devices. Typically these electronics can include one or more RS232 ports and/or electronics to establish an ethernet connection. In other embodiments, electronics to support any number of different communications connections can be provided.

In one embodiment the processor is implemented using the processor identified by the part number PXAS30 KBBE that is manufactured by Philips Semiconductor of Eindhoven, Holland. In other embodiments any combination of processors, discrete components and/or application specific integrated circuits can be used to implement the processor.

Figure 5:
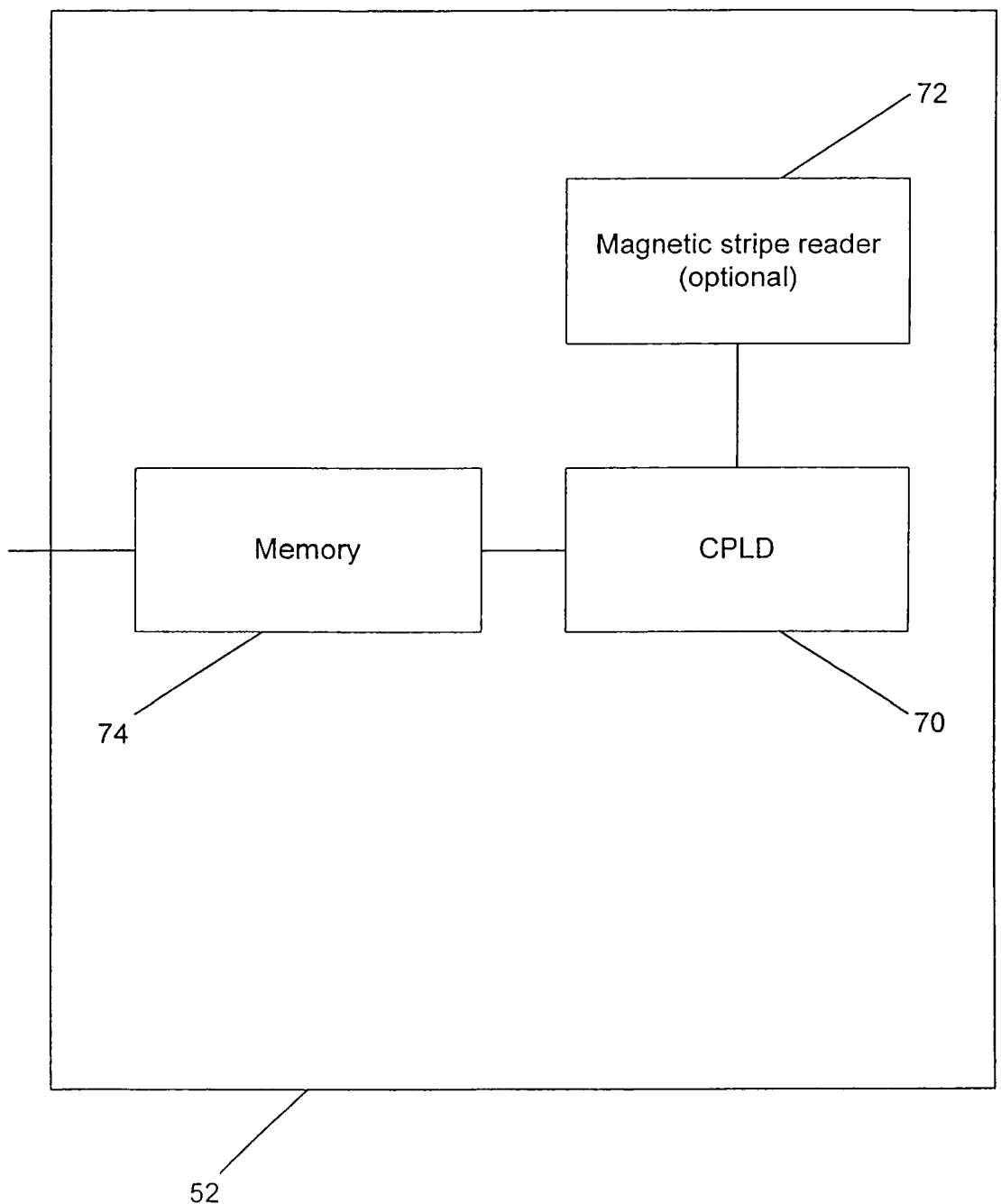
FIG. 5 is a schematic diagram of a memory system in accordance with the present invention.

An embodiment of the memory system is illustrated in greater detail in FIG. 5. The memory system includes a Complex Programmable Logic Device ("CPLD") 70 that includes I/O lines for an optional Magnetic Stripe Reader 72. The memory system can also include a memory block 74 constructed using standard RAM and/or ROM chips to house software and store data. In one embodiment the CPLD is implemented using a configurable memory identified by the part number PSD4235 that is manufactured by STMicroelectronics of Geneva, Switzerland. In other embodiments, other configurable memory chips can be used to implement the memory system.

Figure 6:
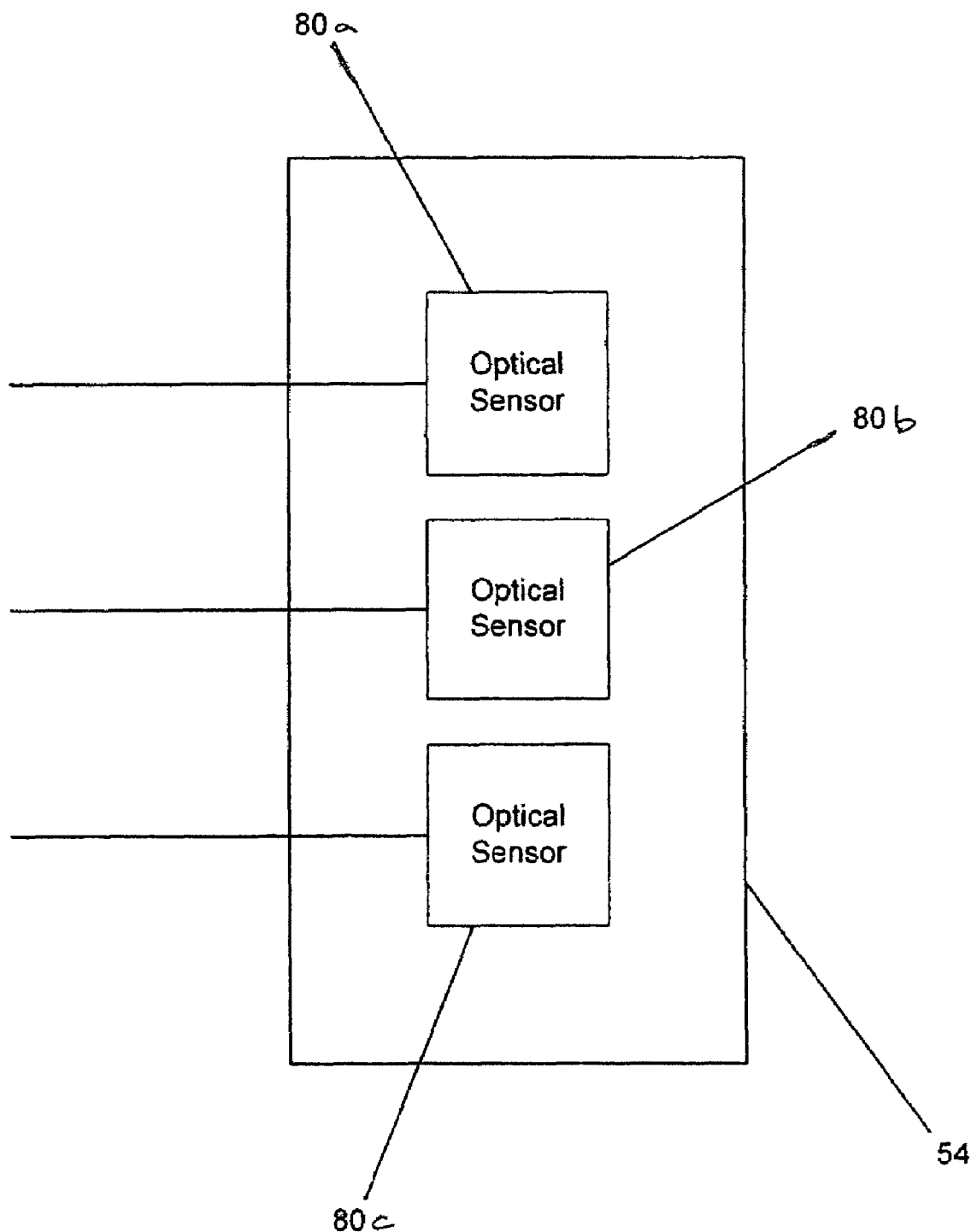
FIG. 6 is a schematic diagram of a paper sensing system in accordance with the present invention.

A more detailed view of a paper sensing system is provided in FIG. 6. The illustrated embodiment includes three sensors (80a, 80b, 80c) that are located in various locations along the check path. The sensors can be implemented using ER sensors and each sensor provides an output that can be interpreted by the processor as indicating the presence or absence of a check at the location monitored by the sensor. Transitions in the signal generated by the sensor can also be used to detect the progress of the leading or trailing edge of a check through the check path.

Figure 7:
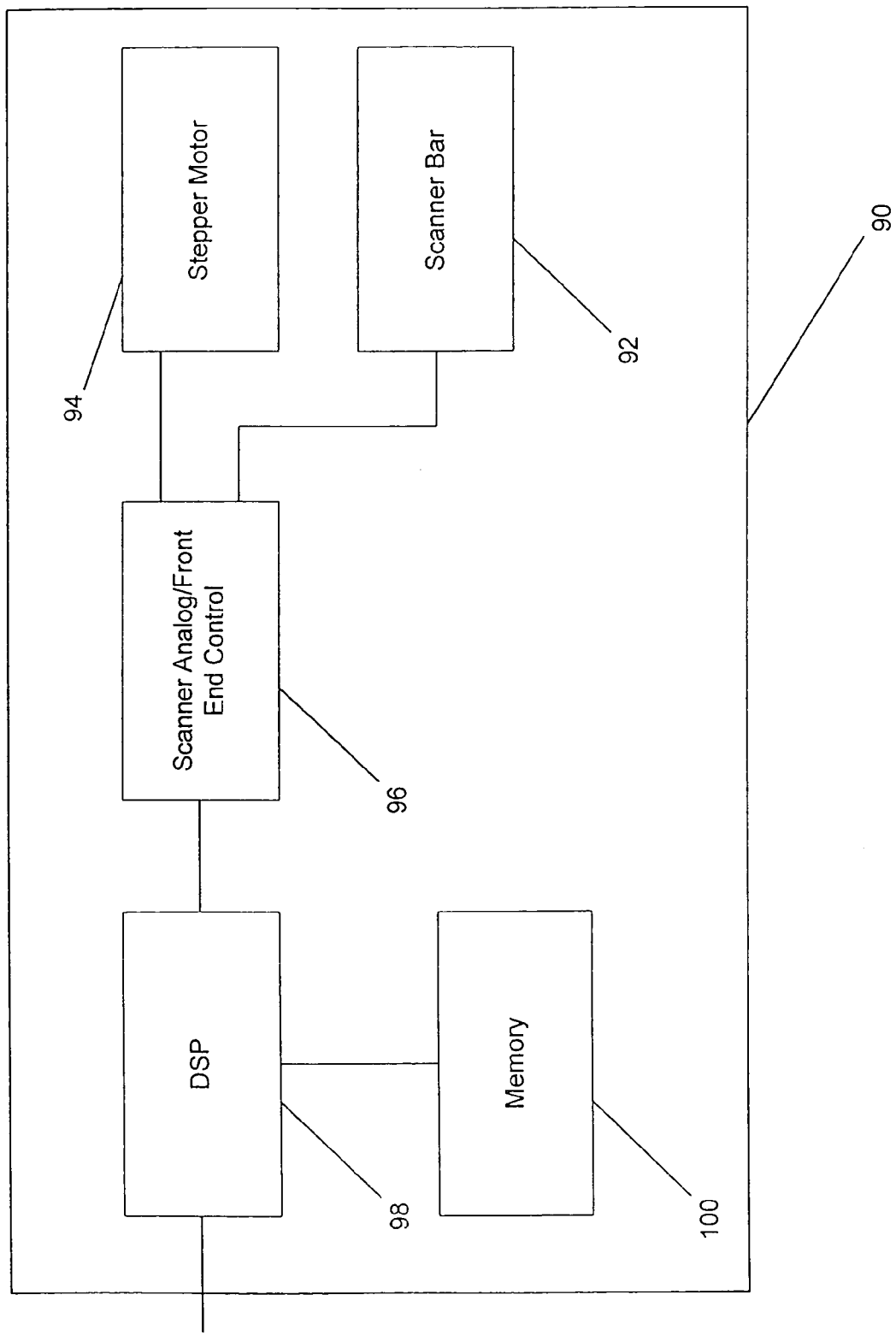
FIG. 7 is a schematic diagram of a scanner system and motor control system in accordance with the present invention that is implemented using a single group of components.

An embodiment of a scanner system and motor control system in which the scanner system and motor control system are combined into a single group of components 90 is illustrated in FIG. 7. The scan bar 92 and the motor 94 are controlled by a device called a Scanner Front End and Control Device 96, which can be implemented using the integrated circuit identified by the part number LM9830 that is manufactured by National Semiconductor of Santa Clara, Calif. or similar devices that is capable of generating signals to achieve charge couple device control, illumination control, pixel processing, memory control and motor control. Outputs of the Scanner and Front End Control Device are provided to a digital signal processor 98 which converts the analog output generated by the scan bar into a digital image of the scanned document or object. Memory 100 is connected to the digital signal processor and provides a location in which generated digital image information can be stored. Any digital signal processor that is designed for use with an optical scanner can be used to implement the digital signal processor.

Figure 8:
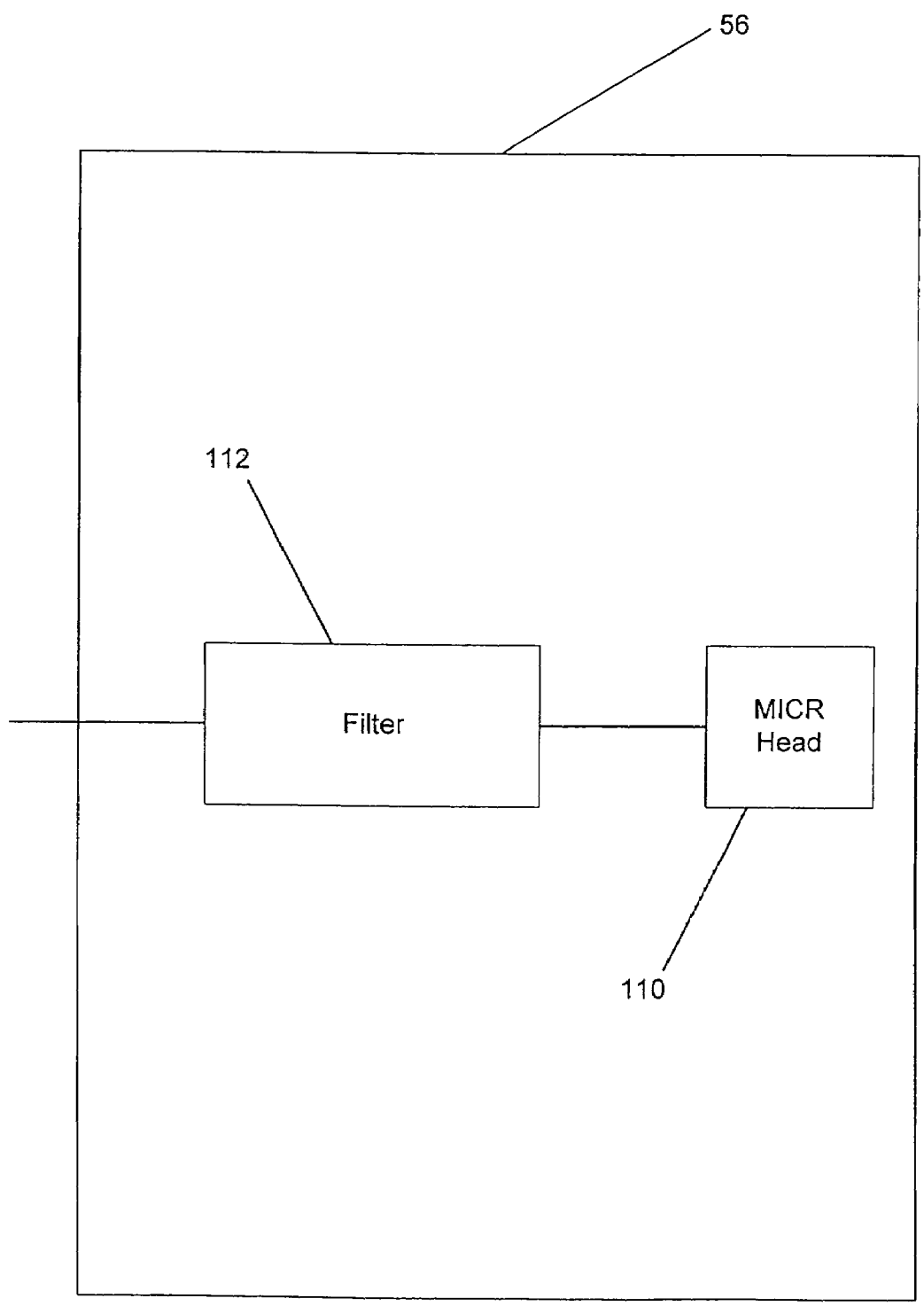
FIG. 8 is a schematic diagram of a MICR reader system in accordance with the present invention.

An embodiment of a MICR reader system is illustrated in FIG. 8. The MICR reader system includes a MICR head 110 which is a magnetic reading head specifically configured to identify information recorded as magnetic ink characters. The output of the MICR head is provided to a filter 112. The filter involves amplification of the signal and bandpass filtering of the signal to eliminate noise beyond the bandwidth of the signals generated by the magnetic ink characters. In one embodiment, the MICR head is implemented using a MICR head identified as part number MHR001 that is manufactured by Brush Industries Inc. of Sunbury, Pa. and the filter can be implemented using discrete components as either an analog or digital filter.

Figure 9:
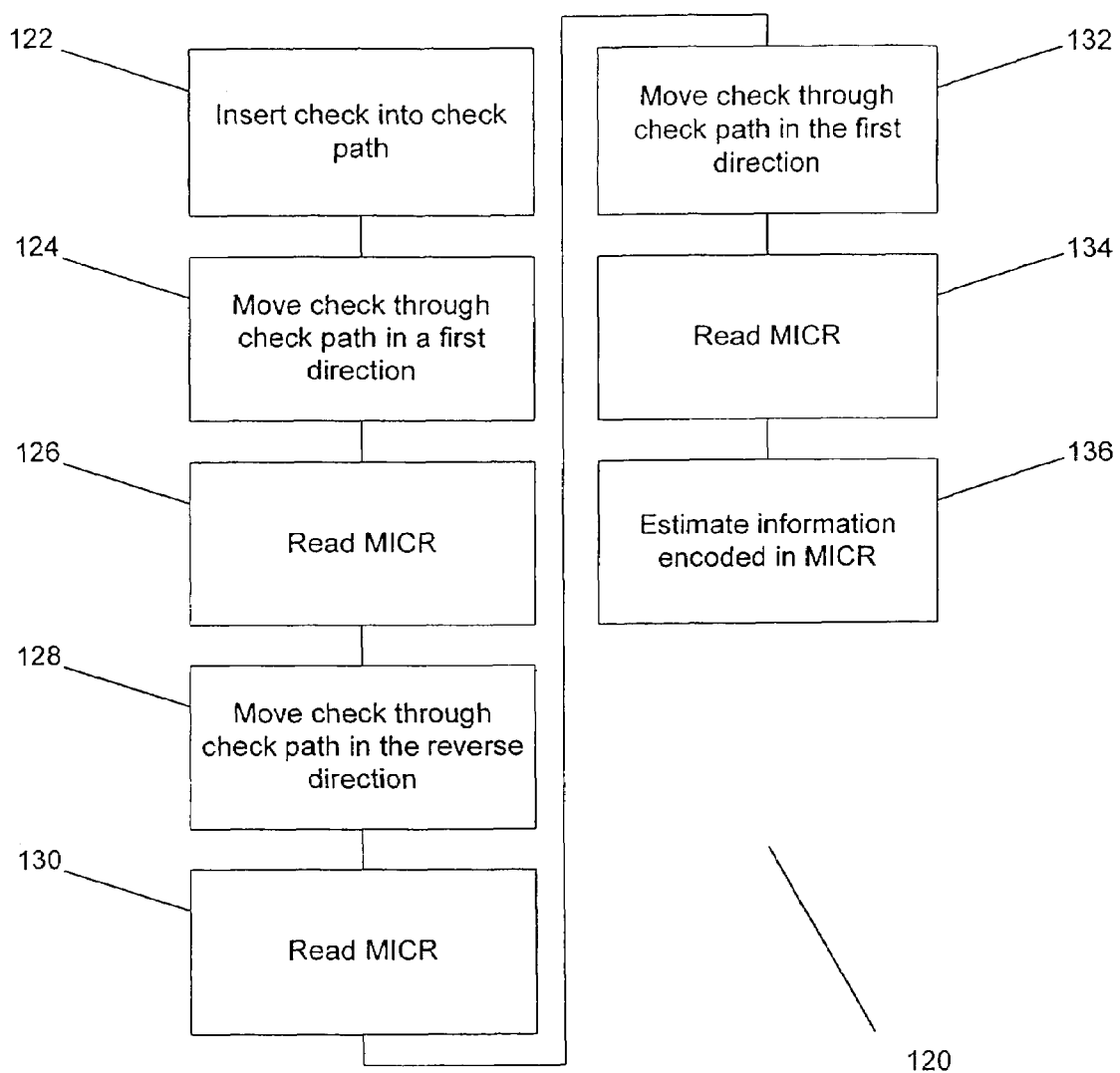
FIG. 9 is a flow diagram showing a method in accordance with the present invention for determining information encoded on a check as magnetic ink characters.

A method of decoding information recorded using magnetic ink characters on a check in accordance with the present invention is illustrated in FIG. 9. The method 120 involves inserting (122) a check into the check path of a check imaging device in accordance with the present invention. The check is then moved (124) through the check path in a first direction and the MICR information on the check is read (126). Once all of the MICR information has been read, the check is moved (128) through the check path in a direction opposite to that in which the check was initially moved. During this second movement of the check, the MICR information is read (130) a second time. Decoding MICR information in reverse can be achieved by sampling the output of a magnetic reading head, reversing the order of the samples and then performing a conventional decode algorithm. Following the second movement, the check may then be moved (132) through the check path in the same direction as the first movement and the MIICR information read (134) for a third time. Once all three readings of the MICR information have been made, the information encoded using magnetic ink characters on the check is determined (136) based on the results of the three readings.

In one embodiment, a determination of the information encoded as MICR on a check is only made if the results of all three readings are the same, given the sensitivity of the system. Otherwise, the check is rejected or a request is made to re-scan the check. Other embodiments only require two readings to match in order to make an estimation of the information encoded in the MICR. Such systems inherently accommodate check misalignments that can be corrected during the first pass of a check through the check reader in the manner described above. In further embodiments, more than three readings of the MICR are taken and in some systems a determination is made provided at least one reading in one direction of motion matches a reading taken in the opposite direction.

Figure 10:
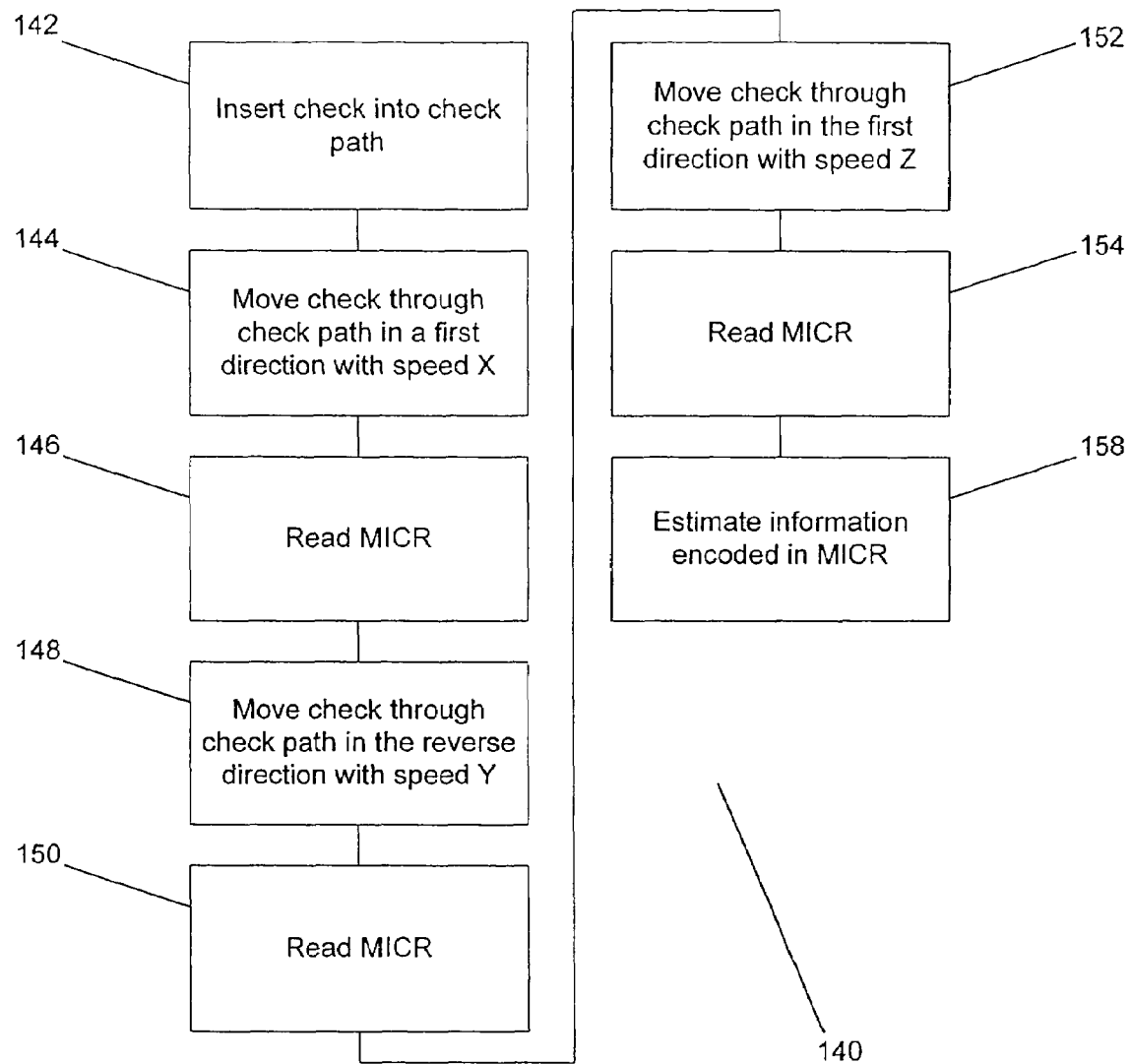
FIG. 10 is a flow diagram showing a method in accordance with the present invention for determining information encoded on a check as magnetic ink characters involving reading the MICR during multiple passes of varying speeds.

Another method of decoding information recorded as magnetic ink characters on a check in accordance with the present invention is illustrated in FIG. 10. This method 140 involves inserting (142) a check into the check path and then moving (144) the check through the check path in a first direction with a speed X. During this movement, the MICR information on the check is read (146). Once the movement is completed, the check is moved (148) through the check path in the reverse direction at a speed Y. The MICR information is also read (150) during this movement. Once the second movement has been completed, the check is moved (158) through the check path a third time. This third movement is made in the same direction as the first movement, but involves moving the check at a speed Z. The MICR information is also read (154) during the third movement. Upon completion of the third movement the information encoded as magnetic ink characters is determined (156). Any of the techniques described above can be used to estimate the MICR information based upon the three readings made during the movement of the check.

The speed X at which the check is initially moved is typically predetermined by the system. The speeds Y and Z can also be predetermined or they can be determined based on the characteristics of the signal obtained when reading the MICR information during any of the preceding movements of the check. If the signal received was weak, then the signal strength in subsequent passes can be increased by increasing the speed with which the check moves through the check path.

If the amplitude of the signal was so large as to be distorted, then the speed of subsequent passes can be decreased. Using passes of different speeds can also facilitate the identification of errors that may result due to the operation of the mechanical system used to move the check through the check reader. Moving the check at the same speed in all passes can result in undetected errors, because the mechanical system generates noise in the output of the magnetic reading head 40 that will be the same in each pass unless the mechanical system is altered in some way. By varying the operational parameters of the mechanical system, mechanical noise generated in one configuration may not be repeated when the system is operated in another configuration.

While the above description contains many specific embodiments of the invention, these should not be construed as limitations on the scope of the invention, but rather as an example of one embodiment thereof. Many other variations are possible. For example, the number of times that the MICR is read may be less than three in circumstances where the paper is moved at varying speeds during each pass or may be more than three as observed above. In addition, different configurations of electronics and mechanics can be used to move the check through the check path in the manner described above. Accordingly, the scope of the invention should be determined not by the embodiments illustrated, but by the appended claims and their equivalents.

What is claimed is:

1. A check reader for reading magnetic ink characters on a check, comprising:
   a check path;
   a motor configured to move the check along the check path;
   a magnetic reading head disposed along the check path;
   a controller configured to control the motor to move the check through the check path in a first pass past the magnetic reading head in a first direction and at a first speed, in a second pass past the magnetic reading head in a reverse direction and at a second speed, and in a third pass past the magnetic reading head in the first direction and at a third speed;
   wherein the controller is configured to:
      receive a signal indicative of an output of the magnetic reading head during each pass of the check past the magnetic reading head;
      decode information from the signal indicative of the output of the magnetic reading head;
      determine a magnitude of the second speed based on the signal indicative of the output of the magnetic reading head received by the controller during the first pass; and
      generate an output signal indicative of the decoded information based on a comparison of all information decoded during said three passes of the check past the magnetic reading head.

2. The check reader of claim 1, wherein the controller is configured to generate the output signal indicative of the decoded information when the decoded information obtained in each of said three passes matches.

3. The check reader of claim 1, wherein the controller is configured to generate output signal indicative of the decoded information when the decoded information in any two of the passes matches.

4. The check reader of claim 1, wherein the controller is configured to generate the output signal indicative of the decoded information when the decoded information in any two passes in which the checks traveled in opposite directions matches.

5. The check reader of claim 1, wherein:
   the controller is configured to determine a magnitude of the third speed based on at least one of the signal indicative of the output of the magnetic reading head received by the controller during the first pass and the signal indicative of the output of the magnetic reading head received by the controller during the second pass.

6. The check reader of claim 1, wherein the second speed is not equal to the first speed.

7. The check reader of claim 1, wherein the third speed is not equal to the second speed.

8. The check reader of claim 1, wherein the controller is configured to make the second speed greater than the first speed when the signal indicative of the output of the magnetic reading head received by the controller during the first pass is low.

9. The check reader of claim 1, wherein the controller is configured to make the second speed less than the first speed when the signal indicative of the output of the magnetic reading head received by the controller during the first pass is high.

10. The check reader of claim 1, wherein the controller is configured to make the second speed less than the first speed when the signal indicative of the output of the magnetic reading head received by the controller during the first pass includes more than a preselected level of distortion.

11. The check reader of claim 1, wherein the controller is configured to vary the second speed and the third speed such that mechanical noise in the output of the magnetic reading head is not repeated.

12. A method of reading magnetic ink characters on a check, comprising:
   moving the magnetic ink characters relative to a magnetic reading head in a first direction and at a first speed in a first pass;
   decoding a first version of the magnetic ink characters based on an output from the magnetic reading head;
   storing the decoded first version of the magnetic ink characters;
   moving the magnetic ink characters relative to the magnetic reading head in a second direction and at a second speed in a second pass;
   decoding a second version of the magnetic ink characters based on an output from the magnetic reading head;
   storing the decoded second version of the magnetic ink characters;
   moving the magnetic ink characters relative to the magnetic reading head in a third direction and at a third speed in a third pass;
   decoding a third version of the magnetic ink characters based on an output from the magnetic reading head;
   storing the decoded third version of the magnetic ink characters;
   determining the second speed based on the output of the magnetic reading head in the first pass;
   determining the third speed based on the output of the magnetic reading head in the first pass; and
   generating an output signal based upon a comparison of the three decoded versions of the magnetic ink characters.

13. The method of claim 12, wherein the third speed is determined based the output of the magnetic reading head during the first pass and the output of the magnetic reading head during the second pass.

14. The method of claim 12, wherein:
   the second direction is opposite the first direction; and
   the third direction is the same as the first direction.

15. The method of claim 12, further comprising making the second speed greater than the first speed when the output of the magnetic reading head during the first pass is low.

16. The method of claim 12, further comprising making the second speed less than the first speed when the signal indicative of the output of the magnetic reading head during the first pass is high.

17. The method of claim 12, further comprising making the second speed less than the first speed when the signal indicative of the output of the magnetic reading head during the first pass includes more than a preselected level of distortion.

18. A method of reading magnetic ink characters on a check, comprising:
  moving the magnetic ink characters relative to a magnetic reading head in a first direction and at a first speed;
  decoding a first version of the magnetic ink characters based on an output from the magnetic reading head;
  storing the decoded first version of the magnetic ink characters;
  moving the magnetic ink characters relative to the magnetic reading head in a second direction and at a second speed determined based on the output of the magnetic reading head in the first direction, wherein second direction is reversed from the first direction;
  decoding a second version of the magnetic ink characters based on an output from the magnetic reading head;
  storing the decoded second version of the magnetic ink characters;
  moving the magnetic ink characters relative to a magnetic reading head in a third direction and at a third speed;
  decoding a third version of the magnetic ink characters based on an output from the magnetic reading head; and
  generating an output signal based upon a comparison of the three decoded versions of the magnetic ink characters.

19. The method of claim 18, wherein the moving the magnetic ink characters relative to the magnetic reading head in a second direction and at a second speed determined based on the output of the magnetic reading head in the first direction further comprises making the second speed greater than the first speed when the output of the magnetic reading head in the first direction is low.

20. The method of claim 18, wherein the moving the magnetic ink characters relative to the magnetic reading head in a second direction and at a second speed determined based on the output of the magnetic reading head in the first direction further

21. The method of claim 18, wherein the moving the magnetic ink characters relative to the magnetic reading head in a second direction and at a second speed determined based on the output of the magnetic reading head in the first direction further comprises making the second speed less than the first speed when the signal indicative of the output of the magnetic reading head in the first direction includes more than a preselected level of distortion.

22. The method of claim 18, further comprising varying the second speed such that mechanical noise in the output of the magnetic reading head is not repeated.

* * * * *